United States Patent [19]

Glabe et al.

[11] 3,843,821

[45] Oct. 22, 1974

[54] THIN FILM DRYING OF MOLASSES WITH ADDITION OF SOY PROTEIN

[75] Inventors: Elmer F. Glabe, Chicago; Perry W. Anderson, Niles; Stergios Laftsidis, Chicago, all of Ill.

[73] Assignee: Food Technology, Inc., Chicago, Ill.

[22] Filed: Apr. 5, 1973

[21] Appl. No.: 348,135

[52] U.S. Cl.................. 426/378, 426/380, 426/364, 426/471
[51] Int. Cl.............................................. A23k 1/02
[58] Field of Search ........... 426/471, 443, 380, 377, 426/378, 213, 215, 205, 208, 364, 468, 210, 426/807; 127/29, 34, 58; 34/9; 159/49

[56] References Cited
UNITED STATES PATENTS 2,801,174  7/1957  Vincenty............................ 426/380
3,064,722  11/1962  Morgan............................... 426/471
3,532,503  10/1970  Kviesitis............................. 426/380
3,718,484  2/1973  Glabe.................................. 426/213

Primary Examiner—Norman Yudkoff
Assistant Examiner—Hiram H. Bernstein
Attorney, Agent, or Firm—Johnston, Keil, Thompson & Shurtleff

[57] ABSTRACT

A solidified product from molasses is prepared by a process in which a high protein, high water soluble soy protein is incorporated with molasses to form a slurry prior to dehydration and enhances the crispness and rapidity of crystalline formation when the slurry is subsequently dehydrated as a thin film on a heated surface.

9 Claims, No Drawings

THIN FILM DRYING OF MOLASSES WITH ADDITION OF SOY PROTEIN

BACKGROUND OF THE INVENTION

The term "molasses" as used herein refers to the uncrystallizable syrup obtained on boiling down raw cane sugar or beet sugar. It usually contains 70 percent to 75 percent solids and 30 percent to 25 percent water.

While it is common to use molasses in its liquid form, it is difficult to handle in this form and it is desirable to provide a solidified molasses product in the form of a dry appearing flowable powder similar to cane sugar. Ordinary cane sugar, although hygroscopic, maintains its free-flowing properties. A solid product which is free-flowing has a number of advantages, especially in making food products, for example, bread, cakes, pastries, ice cream and the like.

OBJECTS

One of the objects of the present invention is to provide an improved process for preparing solidified molasses wherein molasses is dried to a crisp state at an accelerated rate.

Another object is to utilize the thin film principle of drying molasses with the addition of an additive to the slurry to be dehydrated whereby the crispness of the film is enhanced and the rate at which the film assumes a non-adhesive crystalline structure is increased.

A further object of the invention is to produce solidified compositions of the type described having a substantial protein content. Other objects will appear hereinafter.

BRIEF SUMMARY OF THE INVENTION

In accordance with the invention molasses is dehydrated by intimately mixing it with an at least partially de-fatted soy protein flour, with or without an ungelatinized starch having a gelatinization temperature of at least 150° F., in sufficient amount to form a slurry, and subsequently subjecting said slurry in a thin film to a heated surface for a period of time sufficient to dehydrate said slurry, the protein content of said soy protein flour being at least 45 percent by weight, the water soluble protein content being at least 20 percent by weight, the weight ratio of water soluble protein to fat content being at least 1.5:1 and the quantity of said soy protein flour being sufficient to enhance the crispness of said film so that the dehydrated film assumes a crystalline character more rapidly than would be the case without the addition of such soy protein. The resultant dehydrated film is therefore essentially non-adhesive and can readily be ground to a dry-appearing, flowable powder free of gummy, sticky, and lumpy characteristics. The problem of "double sheeting" is thereby avoided and the rate of production can be increased. At the same time a product is obtained containing a substantial amount of protein which is advantageous from the standpoint of food value. De-aerating agents (emulsifiers) are preferably added and anti-humectants can be added to the product.

DETAILED DESCRIPTION OF THE INVENTION

The product obtained in accordance with the invention consists essentially of the following ingredients:

| Ingredients | Parts by Weight |
| --- | --- |
| Molasses solids | 40–60 |
| Partially gelatinized starch of a type having a gelatinization temperature of at least 150°F. | 60–0 |
| Soy protein flour of the type previously described | 0.25–40 |
| Water | 0.5–4.0 |
| Emulsifier | 0–1 |
| Anti-humectant | 0–1 | with the further provision that the product contains at least 0.25 percent, preferably 0.5–1 percent by weight, of said soy protein flour, based on the total weight of molasses solids, soy solids and starch solids.

The invention is based upon the discovery that a high protein, high water soluble at least partially defatted soy protein flour when intimately mixed with molasses, with or without an ungelatinized starch having a gelatinization temperature of at least 150° F., to form a slurry and subsequently subjecting said slurry in a thin film to a heated surface for a period of time sufficient to dehydrate said slurry will enhance the crispness of the film and facilitate the rapidity with which a crystalline structure is formed in the dehydrated film.

In order to be effective, the soy protein flour must have a high protein content of at least 45 percent by weight and the water soluble protein content should be at least 20 percent by weight of the total protein content, preferably within the range of 20 percent to 90 percent by weight. A soy protein should be used which has been at least partially defatted and the weight ratio of water soluble protein to fat content should be at least 1.5:1 and preferably within the range of 1.5:1 to 90:1. Percentagewise in terms of weight per cent the fat content of the soy protein is usually within the range of 1 percent to 16 percent, but a soy protein having a high protein content and a low fat content in which the water soluble protein content is relatively low is ineffective for the purpose of the invention.

If a starch of the type described is mixed with the molasses, the weight ratio of molasses to starch is preferably 60–80:40–20 and the amount of soy protein added is preferably 0.5 to 1 percent by weight of the total starch and molasses.

If no starch is added to the slurry the quantity of soy protein should be approximately 20–40 parts by weight for every 80–60 parts by weight of molasses. This naturally results in a product having a substantial protein content.

It is sometimes desirable to add small amounts of water to the slurry, usually 1 to 3 parts per 150 parts by weight of slurry.

It is preferable to add both an ungelatinized starch of the type described and a soy protein of the type described to the molasses in proportions within the range of 0.25 part to 34.75 parts by weight of said soy protein as soy protein flour, and 34.75 parts to 0.25 part by weight of said starch per 65 parts by weight of said molasses.

When a starch is used, the slurry is heated to a temperature 15° to 30° below the gelatinization temperature of the starch and held at said temperature until the starch is conditioned to the extent that it will only partially gelatinize when subsequently heated above the gelatinization temperature. Thus, when the slurry is in a thin film and is heated on a heated surface above said gelatinization temperature for a period of time sufficient to dehydrate the slurry, the starch is simultaneously partially gelatinized. At the same time the presence of a soy protein of the type described in the amounts previously indicated results in the production of a crisp dehydrated film of crystalline character which is essentially non-adhesive and readily ground to a dry-appearing flowable powder.

In order to obtain optimum results the slurry containing the molasses and the other ingredients previously mentioned is deaerated during heating. Deaeration is facilitated by adding a small amount of an emulsifier, for example, 0.2 percent to 0.8 percent and usually not exceeding 1 percent of total solids. Emulsifiers contain both hydrophile and hydrophobe groups and are effective in causing the release of entrapped air. The deaeration which occurs can be observed by examination of the slurry under a microscope. A preferred deaerator is hydroxylated lecithin. Other suitable emulsifiers are glycerol mono- and distearate or any of the polyoxyethylated emulsifiers normally used in making bread and other bakery products.

The ungelatinized starch employed in the process is preferably wheat starch which has a gelatinization temperature around 160° F. Other examples of suitable starches are corn and rice starch. Wheat starch and rice starch are superior to corn starch because they are bland in flavor, whereas corn starch carries a definite flavor characteristic which it imparts to the finished dried product.

Modified grain starches of the types indicated above may be usable provided that the temperature required for gelatinization is not lower than 150° F. Wheat flour, corn flour, and rice flour are all usable materials in place of the corresponding extracted starches. However, the flavor of the flour in each case is definitely stronger than that of the extracted starch. Therefore, although the flours can be used from a technical standpoint, they are not very feasible for use from a commercial standpoint relative to the taste of the finished dried product.

Root starches such as tapioca and potato are not very successful; in fact, they are almost impossible to use because of their lower gelatinization temperature thereby providing the possibility for too much gelatinization during the drying step.

In the foregoing process, the thin film principle of drying is very important. Thin film drying can be accomplished in a number of ways on commercial drying equipment, for example, by using a double drum hot roll drier either operated at atmospheric pressures or in a vacuum chamber, and tray driers or conveyor driers, again operated either at atmospheric pressures or in a vacuum chamber. The essential feature of the drying method is to subject a thin film of the composition to be dried to a heated surface. The temperature of this surface is usually controlled in a range of 325° F. to 375° F. Exposure of the film to the surface is brief, consisting of approximately 5 to 30 seconds.

In a commercial process the drying process must meet the requirements of low cost to make the process feasible from a commercial standpoint. In terms of the drying process, this means that the raw slurry going to the driers must be easily handled and the dried material coming from the driers must also be in such condition that it can be handled with ease and can be converted into a granular or powdered mass quickly and easily. It should also remain in this condition over long periods of time.

The double drum hot roll drier is the preferred method of accomplishing the thin film drying step. Using this equipment, it is possible to adjust the surface temperature of the rollers by means of controlling the steam pressure entering the double drums. It should be understood, however, that other methods of effecting thin film drying are known and therefore will be applicable to the principle of this invention. The drying equipment, although important, is secondary to the thin film drying principle.

Where a double drum hot roll drier is used, the thickness of the sheet coming from the drying rolls is of some importance and is preferably around 0.011 inch and within the range of 0.006 to 0.015 inch. This can be determined by routine experimentation. If the sheet is too thin it will be too frangible and cause dusting and if it is too thick it may not assume a crystalline structure rapidly enough to meet production demands. In general, the sheet should be thick enough so that it is self-supporting and can be readily handled without being adhesive in character.

The invention will be further illustrated but is not limited by the following example in which the amounts are by weight unless otherwise indicated.

EXAMPLE

The following ingredients were combined:

| Ingredients | Parts by Weight |
| --- | --- |
| Molasses (26% water, 74% solids) | 65.0 |
| Ungelatinized wheat starch | 33.5 |
| Soy protein flour | 1.0 |

The molasses was warmed from approximately room temperature to approximately 110° F. The starch and soy protein flour were then added and the mixture stirred until a smooth slurry was obtained. This slurry was then further warmed and held at an elevated temperature of 130° F. At this point 0.5 part by weight of hydroxylated lecithin was added and mixing was continued to deaerate the slurry. The time required for the first step was approximately 7 to 10 minutes and an additional 5 minutes was required to deaerate the slurry.

When mixing and deaeration was complete the heat was shut off and the mixer stopped. It was then allowed to stand for a minimum of 8 hours and as long as 16 hours. During this standing the temperature will have dropped below 130° F.

The mixer is then started and heat is applied to return the temperature to 130° F. At this point the slurry is ready for pumping to a double drum hot roll drier.

The heating and holding step prior to drying can also be used even when all of the starch is replaced by soy flour.

Upon being pumped to the drier the slurry is permitted to fall into the nip between the two counter-turning rollers. The steam pressure in the rollers is maintained preferably at about 85 pounds per square inch and the roller speed is usually 2.5 revolutions per minute. If the steam pressure is increased the roller speed is increased. If the steam pressure is lowered the roller speed is lowered. These are minor mechanical adjustments and are not essential features of the invention.

Adjustment of the aperture between the rollers should preferably be such as to produce a sheet of the desired thickness as previously described. The aperture may vary relative to the amount of additive versus the amount of molasses solids in the slurry.

When all of the above features have been carefully controlled, as in this example, the film, when it reaches the knife blade, will be very easily shaved away from the surface of the hot rolls. The appearance of the sheet at the knife blade is that of a piece of thin paper. It is limber because the temperature is still quite high. As cooling takes place, however, the sheet becomes rapidly fragile and shatterable. This is a matter of seconds. The sheet is easily broken into flakes or granules and, if desired, can be passed through a hammermill or other milling device to reduce the particle size. If a powdered material is desired, the ideal particle size is 100 percent through 30 mesh (Standard sieve series).

Using this general procedure on a ten inch double drum hot roll drier with equipment for cooling the dehydrated product and with different types of soy proteins and different proportions of soy protein and starch, and by rating the characteristics of the dehydrated films in categories of "Good," "Fair," and "Poor," it was established that only soy proteins having a high protein content and a high water soluble protein content of at least 40 percent by weight received a rating of "Good." Examples of such proteins are the following:

a. A soy protein (Soy Fluff 200–W) having a protein content of 53.0 percent, a water soluble protein content of 70.0 percent and a fat content of 1.0 percent;

b. A soy protein (Soy Fluff 200–C) having a protein content of 53.0 percent, a water soluble protein content of 40.0 percent and a fat content of 1.0 percent;

c. A soy protein (Soyalose 105) having a protein content of 52.0 percent, a water soluble protein content of 65.0 percent and a fat content of 6.0 percent;

d. A soy protein (Soyarich 115) having a protein content of 45.0 percent, a water soluble protein content of 65.0 percent and a fat content of 16.0 percent;

e. A soy protein (Pro-Fam 70 H/S) having a protein content of 70.0 percent, a water soluble protein content of 90.0 percent and a fat content of 1.0 percent; and f. A soy protein (Pro-Fam 90H/S) having a protein content of 90.0 percent, a water soluble protein content of 88.0 percent and a fat content of 1.0 percent.

Several other commercial soy proteins having the desired characteristics were also evaluated and rated "Good" (Ardex 550, NV Protein and Promine D).

A commercial protein (Pro-Fam 90 L/A) having a 90 percent protein content of which only 20 percent was water soluble protein rated "Fair," thereby indicating that the percentage of water soluble protein should be at least 20 percent of the total protein content.

Two soy proteins, Soya Fluff 200–T and Soyabits 100–T, both having a protein content of 53.0 percent and a fat content of 1.0 percent but a relatively low percentage (15.0 percent) of water soluble protein content rated "Poor." Similarly another soy protein having a protein content of 70.0 percent, a water soluble protein content of 10.0 percent and a fat content of 1.0 percent rated "Poor."

Comparable tests with other protein containing substances namely, defatted sesame seed flour, cotton seed flour, gelatinized corn flour, lactalbumen, crystallite cellulose (Avicel), wheat gluten, corn flour, barley flour, dried egg albumen, animal gelatin, autolyzed yeast and dried buttermilk each rated "Poor."

In the foregoing tests 1.0 percent of the protein materials was used, i.e., one part of protein material replaced one part of wheat starch in the preparation of the slurry.

The results of these evaluations indicates that only soybean materials having high protein and high water solubility are effective for the intended purpose and materially add to the film-forming, crispness and crystalline nature of the film in the drying of molasses.

Tests using various levels of the soy protein fractions show that at the low end of the scale 0.25 part is the minimum which shows any effect whatsoever. At the high end of the scale it has been found that all of the starch can be replaced with a high protein high water soluble protein soy fraction. Thus, the slurry can be made with 65 parts of molasses and 35 parts of soy protein flour with no starch whatsoever. The manner in which the soy protein flour is prepared appears to be immaterial so long as the protein content is high and the protein content has a high percentage of water soluble protein. The fat content is preferably low and usually does not exceed 6 percent although in one case a soy protein having a fat content of 16 percent was found to be effective. Methods of removing fat (or oil) from soy proteins are well known in the art. The method most often used currently is a solvent extraction method but oils can also be removed by the expeller method in which case the residual fat content is normally higher than that of the solvent extracted soy proteins. Defatted soy protein materials can also be treated, for example, by extraction with alkaline aqueous solutions to remove soy proteins and thereby produce soy proteins having a high protein content and a high water soluble protein content. Other methods can be used to modify, hydrolyze, or otherwise degrade soy products in order to produce derivatives having a high soy protein content, as well as a high percentage of water soluble proteins.

Throughout the specification and claims the "water solubility" of the water soluble soy protein refers to water solubility as determined by a standard testing method given in Association of Official Agricultural Chemists (A.O.A.C.) 9th Edition, page 164, test 13.032, published in 1960.

The invention is hereby claimed as follows:

1. A process for dehydrating molasses which comprises intimately mixing said molasses with an at least partially defatted soy protein flour to form a slurry, and subsequently subjecting said slurry in a thin film to a heated surface for a period of time sufficient to dehydrate said slurry, the quantity of said soy protein being sufficient to enhance the crispness of said film, the protein content of said soy protein being at least 45 percent by weight, the water soluble protein content being at least 20 percent by weight of the total protein content, and the weight ratio of water soluble protein to fat content being at least 1.5:1, in which said soy protein comprises approximately 35 parts by weight and said molasses approximately 65 parts by weight.

2. A process as claimed in claim 1 in which said slurry contains 60 to 80 parts by weight molasses, at least 0.25 part by weight of said soy protein flour and a total of 0.25 to 40 parts by weight of a substance from the group consisting of said soy protein flour and an ungelatinized starch having a gelatinization temperature of at least 150° F.

3. A process as claimed in claim 1 in which said soy protein is a soy flour having a water soluble protein content within the range of 20 percent by weight to 90 percent by weight.

4. A process as claimed in claim 3 in which the weight ratio of water soluble protein to fat content of said soy flour is within the range of 1.5:1 to 90:1.

5. A process for dehydrating molasses which comprises intimately mixing said molasses with an at least partially defatted soy protein flour to form a slurry, and subsequently subjecting said slurry in a thin film to a heated surface for a period of time sufficient to dehydrate said slurry, the quantity of said soy protein being sufficient to enhance the crispness of said film, the protein content of said soy protein being at least 45 percent by weight, the water soluble protein content being at least 20 percent by weight of the total protein content, and the weight ratio of water soluble protein to fat content being at least 1.5:1, in which an ungelatinized starch having a gelatinization temperature of at least 150° F. is added to said slurry containing said molasses and said soy protein, the slurry is heated to a temperature 15° to 30° below the gelatinization temperature of said starch and held at said temperature until said starch is conditioned to the extent that it will only partially gelatinize when subsequently heated above the gelatinization temperature, and subsequently subjecting said slurry in a thin film to a heated surface above said gelatinization temperature for a period of time sufficient to dehydrate said slurry and simultaneously to partially gelatinize said starch to obtain a thin crisp dehydrated film of crystalline character which is essentially non-adhesive and readily ground to a dry appearing flowable powder, the quantity of said soy protein, said starch and said molasses being within the range of 0.25 part to 34.75 parts by weight of soy protein as soy protein flour and 34.75 parts to 0.25 part by weight of said starch per 65 parts by weight of said molasses.

6. A process as claimed in claim 5 in which said starch is wheat starch.

7. A process as claimed in claim 5 in which the weight ratio of molasses to starch in said slurry initially is 60–80:40–20 and the amount of said soy protein added is 0.5 percent to 1 percent by weight of the total starch and molasses.

8. A process as claimed in claim 5 in which said soy protein is a soy flour having a water soluble protein content within the range of 20 percent by weight to 90 percent by weight.

9. A process as claimed in claim 8 in which the weight ratio of water soluble protein to fat content of said soy flour is within the range of 1.5:1 to 90:1.

* * * * *

UNITED STATES PATENT OFFICE
CERTIFICATE OF CORRECTION

PATENT NO. : 3,843,821
DATED : October 22, 1974
INVENTOR(S) : Elmer F. Glabe, Perry W. Anderson and Stergios Laftsidis It is certified that error appears in the above-identified patent and that said Letters Patent are hereby corrected as shown below:

Column 7, line 3, "claim 1" should read --claim 5--.

Signed and Sealed this twenty-first Day of October 1975

[SEAL]

Attest:

RUTH C. MASON
Attesting Officer

C. MARSHALL DANN
Commissioner of Patents and Trademarks